United States Patent
Zeng et al.

(10) Patent No.: US 12,444,741 B2
(45) Date of Patent: Oct. 14, 2025

(54) LITHIUM ION BATTERY WITH HIGH CAPACITY

(71) Applicant: XTC New Energy Materials (Xiamen) Co., Ltd., Xiamen (CN)

(72) Inventors: Leiying Zeng, Xiamen (CN); Bolie Yu, Xiamen (CN); Guozhen Wei, Xiamen (CN); Zhen Lin, Xiamen (CN); Nengjian Xie, Xiamen (CN)

(73) Assignee: XTC New Energy Materials (Xiamen) Co., Ltd., Xiamen (CN)

( * ) Notice: Subject to any disclaimer, the term of this patent is extended or adjusted under 35 U.S.C. 154(b) by 585 days.

(21) Appl. No.: 17/929,104

(22) Filed: Sep. 1, 2022

(65) Prior Publication Data

US 2024/0079581 A1  Mar. 7, 2024

(51) Int. Cl.
*H01M 4/525* (2010.01)
*H01M 4/02* (2006.01)
(Continued)

(52) U.S. Cl.
CPC ......... *H01M 4/525* (2013.01); *H01M 4/0471* (2013.01); *H01M 10/0525* (2013.01); *H01M 2004/021* (2013.01)

(58) Field of Classification Search
CPC ............. H01M 4/525; H01M 10/0525; H01M 2004/021
(Continued)

(56) References Cited

U.S. PATENT DOCUMENTS

2006/0233696 A1* 10/2006 Paulsen .................. C01G 53/50
                                                            423/594.6
2024/0222614 A1*  7/2024 Arai ........................ H01M 4/46

FOREIGN PATENT DOCUMENTS

CN        111900501 A      11/2020
CN        113353991 A       9/2021
(Continued)

*Primary Examiner* — Allison Bourke
*Assistant Examiner* — Robert Gene West
(74) *Attorney, Agent, or Firm* — Fox Rothschild LLP

(57) ABSTRACT

The present invention discloses a lithium ion battery with high capacity, which comprises an cathode material, a anode material and an electrolyte. The cathode material has a chemical formula $LiNi_{(1-x)}Me_xO$, wherein x is $10^{-6}$ to $10^{-1}$, and Me is a third metal other than Li and Ni. Said material has the advantages of high purity, high density and high delithiation capacity. The preparation method of the cathode material comprises: subjecting a nickel salt and an additive to chemical co-precipitation, calcining, and inducing of a crack structure with an inducing environment, an inducing chemical, or a combination thereof to give a precursor, which is mixed with $Li_2O$, sintered and crushed to give the cathode material. Through the inducing effect of the inducing environment or the inducing chemical, the crystal structure is changed, cracks are formed, and the volume of the crystal cell is further enlarged, so that lithium ions can react with NiO more sufficiently, thereby reducing the segregation, improving the purity and density of the prelithiating material, improving the delithiation capacity, and improving the overall electric capacity of the lithium ion battery.

10 Claims, 1 Drawing Sheet

(51) Int. Cl.
*H01M 4/04* (2006.01)
*H01M 10/0525* (2010.01)

(58) Field of Classification Search
USPC .......................................................... 429/209
See application file for complete search history.

(56) References Cited

FOREIGN PATENT DOCUMENTS

| CN | 113353992 A | 9/2021 |
| CN | 114447334 A | 5/2022 |

\* cited by examiner

LITHIUM ION BATTERY WITH HIGH CAPACITY

TECHNICAL FIELD

The present invention belongs to the technical field of lithium ion batteries, and specifically relates to a delithiating material, especially to a high-purity delithiating material and its preparation method.

BACKGROUND

In order to improve the energy density of lithium ion batteries, silicon anode materials with high specific capacities are gradually becoming the choice of battery companies and material suppliers, and are becoming one of the most potential anode materials for next generation lithium ion batteries. However, relatively large volume expansion and relatively low initial coulombic efficiency of silicon anodes limit their practical applications. Since the coulombic efficiency of the cathode is much higher than that of the anode, the capacity of the cathode material cannot be fully utilized, resulting in waste of the cathode material and reduction of the battery capacity. This is mainly because a solid electrolyte film, or an SEI film, is formed on the surface of the anode material during the initial charging process, which consumes lithium ions, while lithium ions are almost entirely supplied by the cathode material in the battery. Therefore, the concept of "lithium supplementation" was proposed. By "lithium supplementation" on the anode, the cathode or the separator, the lithium ions consumed by the formation of the SEI film during the initial charging process of the battery are compensated.

The process of lithium supplementation on the cathode comprises adding a material with a high lithium capacity to the cathode during the homogenization process. During the charging process, excess lithium element is extracted from the high lithium capacity cathode material and inserted into the anode to compensate the irreversible lithium capacity loss in the initial charge and discharge.

Therefore, a lithium source is sought outside the cathode material, so that the lithium ions consumed in the formation of the SEI film are from the external lithium source, so as to compensate the waste of lithium ions de-intercalated from the cathode material, and finally improve the capacity of the full battery. The process of providing an external lithium source is called prelithiation, and said external lithium source is called a prelithiating material.

Prelithiating materials have been a research hotspot in the field of lithium batteries in recent years. Patent CN107221650B describes a lithium supplementing additive and its preparation method. The additive is prepared by mixing various materials in certain proportions, and sintering in a plurality of steps. However, the purity of the active ingredient is relatively low, and some products have small particle sizes and high activities, making it difficult to store. According, a further passivation treatment is required, and the process is complicated. Patent application CN107819113A discloses a lithium supplementing additive and its preparation method and application. The lithium supplementing additive has a core-shell structure, in which the core material is a conductive carbon material, and the shell material is lithium oxide. Lithium oxide is deposited on the surface of the conductive carbon material. Nano-sized lithium oxide particles form a nano-layer shell. The preparation method is complicated and difficult.

In existing patents and researches, the raw materials and methods for synthesizing $Li_2NiO_2$ mainly comprise selecting $Li_2O$/LiOH and corresponding nickel salts, and adding additives for solid-phase synthesis. However, in the actual synthesis process, it is found that although $Li_2NiO_2$ samples can be synthesized, they have high impurity contents, the main reason of which is that NiO is easy to agglomerate and segregate during the synthesis process, and the reproducibility is poor.

Therefore, researches on prelithiating materials with high purity and good lithium supplementing capacity have become a current research focus.

SUMMARY OF THE INVENTION

The main purpose of the present invention is to overcome the defects of the prior art, and to provide a prelithiating material and its preparation method. The prelithiating material is characterized by high purity, high density and high delithiation capacity.

To realize the above purpose of the invention, the present invention provides the following technical solutions.

According to one aspect of the present invention, there is provided a prelithiating material with a chemical formula $LiNi_{(1-x)}Me_xO$, wherein x is $10^{-6}$ to $10^{-1}$, and Me is a third metal other than Li and Ni.

According to an embodiment of the present invention, the third metal is one or more elements selected from the group consisting of Sr, Y, Nb, Ce, Ta, Mo and W.

According to an embodiment of the present invention, the prelithiating material contains cracks, which have a width of 0.5 nm to 1 nm or 1 nm to 100 nm, and a length of 0.5 nm to 1 nm or 1 nm to 500 nm.

According to an embodiment of the present invention, the prelithiating material has a median particle size $D_{50}$ of 1 μm to 20 μm, and a specific surface area of 0.1 $m^2$/g to 100 $m^2$/g; preferably, the prelithiating material has a median particle size $D_{50}$ of 3 μm to 15 μm, and a specific surface area of 5 $m^2$/g to 50 $m^2$/g.

According to another aspect of the present invention, there is provided a method for preparing a prelithiating material, mainly comprising the following steps:
  S1, preparing precursor 1 from a nickel salt and an additive by chemical co-precipitation;
  S2, calcining precursor 1 in an inert atmosphere, to prepare precursor 2;
  S3, subjecting precursor 2 to an inducing treatment to induce a crack structure, to prepare precursor 3; and
  S4, mixing precursor 3 with $Li_2O$ in an equimolar ratio, sintering in an inert atmosphere, and crushing to prepare the prelithiating material.

According to an embodiment of the present invention, the nickel salt is one or more of nickel sulfate, nickel nitrate, nickel chloride, and nickel bromide.

According to an embodiment of the present invention, the additive is one or a mixture of Sr, Y, Nb, Ce, Ta, Mo and W compounds.

According to an embodiment of the present invention, precursor 2 has a chemical formula $Ni_{(1-x)}Me_xO$, and the total content of free water and crystal water in precursor 2 is controlled below 0.001% by molar.

According to an embodiment of the present invention, the inert gas is selected from the group consisting of nitrogen, helium, neon, argon and a mixture thereof.

According to an embodiment of the present invention, the inducing treatment comprises placing in an inducing environment, adding an inducing chemical, or both.

According to an embodiment of the present invention, the inducing environment is a low temperature environment, a high pressure environment, a high temperature quenching environment, or a combination thereof.

According to an embodiment of the present invention, the temperature for the low temperature environment is from −100° C. to −250° C.

According to an embodiment of the present invention, the pressure for the high pressure environment is from 10 bar to 500 bar.

According to an embodiment of the present invention, the high temperature quenching environment comprises first heating to a temperature of 300° C. to 800° C., and then rapidly cooling to room temperature in liquid nitrogen.

According to an embodiment of the present invention, the inducing chemical is one or a mixture of Sr, Y, Nb, Ce, Ta, Mo and W compounds.

Comparing with the prior art, the present invention provides the following beneficial effects:
1. The prelithiating material of the present invention is characterized by high purity, high density and high delithiation capacity.
2. In the method for preparing the prelithiating material of the present invention, through the inducing effect of the inducing environment or the inducing chemical, the crystal structure is changed, and the volume of the crystal cell is further enlarged, so that lithium ions can react with NiO more sufficiently, thereby reducing the segregation, improving the purity and density of the prelithiating material, improving the delithiation capacity, and improving the overall electric capacity of the lithium ion battery.

DETAILED DESCRIPTION

Figure 1:
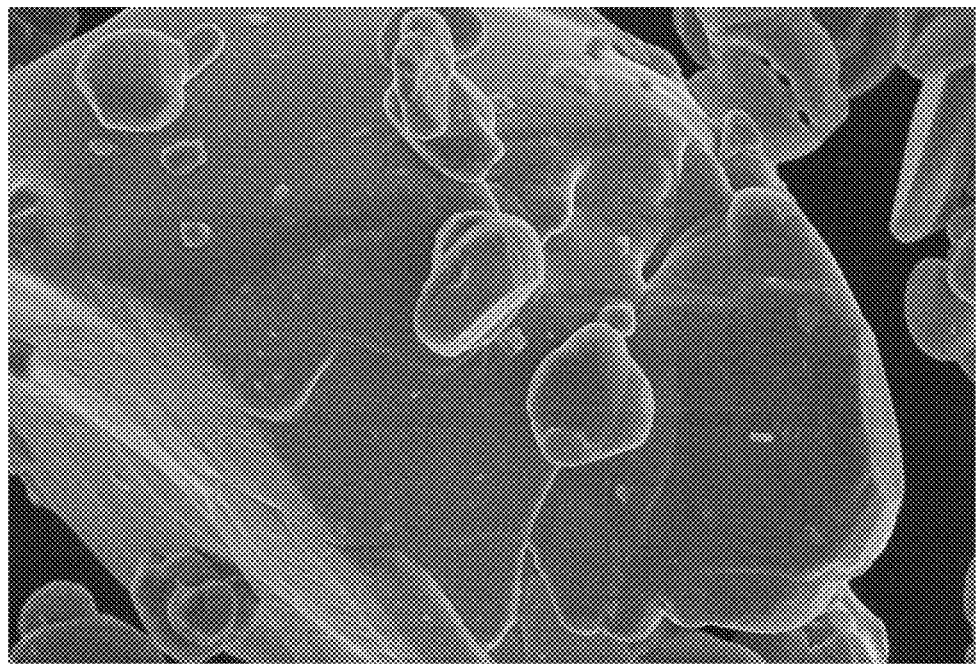
FIG. 1 is the SEM graph of the material prepared in Example 2.

Exemplary embodiments reflecting the features and advantages of the present invention will be described in detail in the following description. It should be understood that various changes can be made to different embodiments without departing from the scope of the present invention, and the description herein are for illustrative purposes in nature rather than limiting the present invention.

In an embodiment of the present invention, there is provided a prelithiating material with a chemical formula $LiNi_{(1-x)}Me_xO$, wherein x is $10^{-6}$ to $10^{-1}$, e.g., $10^{-6}$, $10^{-5}$, $10^{-4}$, $10^{-3}$, $10^{-2}$, $10^{-1}$; Me is a third metal other than Li and Ni.

In an embodiment of the present invention, the third metal is one or more elements selected from the group consisting of Sr, Y, Nb, Ce, Ta, Mo and W.

In an embodiment of the present invention, the prelithiating material contains cracks, which have a width of 0.5 nm to 1 nm or 1 nm to 100 nm, e.g., 0.5 nm, 0.8 nm, 1 nm, 10 nm, or 100 nm; and a length of 0.5 nm to 1 nm or 1 nm to 500 nm, e.g., 0.5 nm, 0.8 nm, 1 nm, 10 nm, 20 nm, 200 nm, 300 nm, 400 nm, or 500 nm.

In an embodiment of the present invention, the prelithiating material has a median particle size $D_{50}$ of 1 µm to 20 µm, e.g., 1 µm, 5 µm, 10 µm, 16 µm, or 20 µm; preferably, the prelithiating material has a median particle size $D_{50}$ of 3 am to 15 µm, e.g., 3 µm, 6 µm, 9 µm, 12 µm, or 15 µm.

In an embodiment of the present invention, the prelithiating material has a specific surface area of 0.1 $m^2/g$ to 100 $m^2/g$, e.g., 0.1 $m^2/g$, 10 $m^2/g$, 60 $m^2/g$, or 100 $m^2/g$; preferably, the prelithiating material has a specific surface area of 5 $m^2/g$ to 50 $m^2/g$, e.g., 5 $m^2/g$, 20 $m^2/g$, 30 $m^2/g$, 40 $m^2/g$, or 50 $m^2/g$.

In an embodiment of the present invention, there is provided a method for preparing a prelithiating material, mainly comprising the following steps:
S1, preparing precursor 1 from a nickel salt and an additive by chemical co-precipitation;
S2, calcining precursor 1 in an inert atmosphere, to prepare precursor 2;
S3, subjecting precursor 2 to an inducing treatment to induce a crack structure to prepare precursor 3; and
S4, mixing precursor 3 with $Li_2O$ in an equimolar ratio, sintering in an inert atmosphere, and crushing to prepare the prelithiating material.

In an embodiment of the present invention, the nickel salt is one or more of nickel sulfate, nickel nitrate, nickel chloride, and nickel bromide.

In an embodiment of the present invention, the additive is one or a mixture of Sr, Y, Nb, Ce, Ta, Mo and W compounds, wherein the Sr compound may be $SrCO_3$, $SrO$ or $SrSO_4$, the Y compound may be $Y(NO_3)_3$, $Y_2(SO_4)_3$, $Y_2O_3$, $YBr_3$ or $Y_2(CO_3)_3$, the Nb compound may be $LiNbO_3$, $NbCl_5$ or $NbN$, the Ce compound may be $CeCl_3$, $CeBr_3$ or $Ce_2O_3$, the Ta compound includes $TaCl_5$ or $TaBr_5$, the Mo compound may be $MoO_3$, $Mo(SO_4)_3$ or $Mo(NO_3)_6$, and the W compound may be $Na_2WF_8$.

In an embodiment of the present invention, precursor 2 has a chemical formula $Ni_{(1-x)}Me_xO$, and the total content of free water and crystal water in precursor 2 is controlled below 0.001% by molar, e.g., 0.001%, 0.0008%, 0.0006%, 0.0004%, or 0.0002% by molar.

In an embodiment of the present invention, the inert gas is selected from the group consisting of nitrogen, helium, neon, argon and a mixture thereof.

In an embodiment of the present invention, the inducing treatment comprises placing in an inducing environment, adding an inducing chemical, or both.

In an embodiment of the present invention, the inducing environment is a low temperature environment, a high pressure environment, a high temperature quenching environment, or a combination thereof.

In an embodiment of the present invention, the temperature for the low temperature environment is from −100° C. to −250° C., e.g., −100° C., −150° C., −200° C., or −250° C.

In an embodiment of the present invention, the pressure for the high pressure environment is from 10 bar to 500 bar, e.g., 100 bar, 200 bar, 400 bar, or 500 bar.

In one embodiment of the present invention, the high temperature quenching environment comprises first heating to 300° C. to 800° C., e.g., 300° C., 400° C., 500° C., 500° C., 600° C., 700° C., or 800° C., and then rapidly cooling to room temperature in liquid nitrogen.

In an embodiment of the present invention, the inducing chemical is one or a mixture of Sr, Y, Nb, Ce, Ta, Mo and W compounds, wherein the Sr compound may be $SrCO_3$, $SrO$ or $SrSO_4$, the Y compound may be $Y(NO_3)_3$, $Y_2(SO_4)_3$, $Y_2O_3$, $YBr_3$ or $Y_2(CO_3)_3$, the Nb compound may be $LiNbO_3$, $NbCl_5$ or $NbN$, the Ce compound may be $CeCl_3$, $CeBr_3$ or $Ce_2O_3$, the Ta compound includes $TaCl_5$ or $TaBr_5$, the Mo compound may be $MoO_3$, $Mo(SO_4)_3$ or $Mo(NO_3)_6$, and the W compound may be $Na_2WF_8$.

Hereinbelow, the prelithiating material of the present invention and its preparation method will be further described with reference to specific examples.

Example 1

10 kg of analytically pure nickel sulfate and 0.01 g of analytically pure cerium sulfate were used as raw materials and were formulated into a solution comprising 1 mol/L sulfate. 5 L of the sulfate solution, 8 L of 1 mol/L sodium hydroxide solution, and 0.2 L of 10 mol/L aqueous ammonia were added to a reaction vessel to carry out the reaction. The precipitate was filtered, washed and dried to give precursor 1, which was denoted by $Ni_{(1-x)}Me_x(OH)_2$, wherein Me was Ce, and x was $10^{-5}$. Precursor 1 was sintered in a nitrogen atmosphere under a pressure of 30 bar and a temperature of 750° C. for 60 min, to give precursor 2, which was denoted by $Ni_{(1-x)}Me_xO$, wherein Me was Ce, and x was $10^{-5}$. 0.005 g of cerium sulfate as the inducing chemical was added to precursor 2, mixed uniformly, and maintained at −196° C. in liquid nitrogen for 60 min. Under the synergistic action of the low temperature environment and the inducing chemical, the crystal structure and the grain size were changed to give precursor 3. Precursor 3 was mixed with $Li_2O$ in an equimolar ratio, and sintered in a nitrogen atmosphere at a pressure of 40 bar and a temperature of 800° C. for 80 min, then cooled to room temperature, and crushed to a median particle size $D_{50}$ of 10 μm to give the prelithiating material. The prelithiating material contained cracks, in which the width and the length of small cracks were 0.5 nm to 1 nm, and the width and the length of large cracks were 1 nm to 50 nm and 10 nm to 400 nm, respectively. The prelithiating material had a purity of 94.5%. A lithium ion battery was prepared using the prelithiating material as the cathode material, graphite as the anode material, and a solution of lithium hexafluorophosphate in ethyl carbonate as the electrolyte. The battery has an initial charging capacity of 410.5 mAh/g at 4.5 V.

Example 2

10 kg of analytically pure nickel chloride and 0.1 g of analytically pure niobium pentachloride were used as raw materials and were formulated into a solution comprising 1 mol/L sulfate. 5 L of the sulfate solution, 8 L of 1 mol/L sodium hydroxide solution, and 0.2 L of 10 mol/L aqueous ammonia were added to a reaction vessel to carry out the reaction. The precipitate was filtered, washed and dried to give precursor 1, which was denoted by $Ni_{(1-x)}Me_x(OH)_2$, wherein Me was Nb, and x was $10^{-3}$. Precursor 1 was sintered in a nitrogen atmosphere under a pressure of 30 bar and a temperature of 750° C. for 60 min, to give precursor 2, which was denoted by $Ni_{(1-x)}Me_xO$, wherein Me was Nb, and x was $10^{-3}$. 0.02 g of niobium pentachloride as the inducing chemical was added to precursor 2, mixed uniformly, and maintained in an isostatic pressure environment at 150 bar for 60 min. After decompression, it was heated to 500° C. and maintained for 60 min, and then rapidly cooled to room temperature by liquid nitrogen. Under the synergistic action of the pressurized environment and the inducing chemical, the crystal structure and the grain size were changed to give precursor 3. Precursor 3 was mixed with $Li_2O$ in an equimolar ratio, and sintered in a nitrogen atmosphere at a pressure of 40 bar and a temperature of 800° C. for 80 min, then cooled to room temperature, and crushed to a median particle size $D_{50}$ of 10 μm to give the prelithiating material. The prelithiating material contained cracks, in which the width and the length of small cracks were 0.5 nm to 0.8 nm, and the width and the length of large cracks were 1 nm to 90 nm and 5 nm to 300 nm, respectively. The prelithiating material had a purity of 97.6%. A lithium ion battery was prepared using the prelithiating material as the cathode material, graphite as the anode material, and a solution of lithium hexafluorophosphate in ethyl carbonate as the electrolyte. The battery has an initial charging capacity of 431.1 mAh/g at 4.5 V.

FIG. 1 is the SEM graph of the material prepared in Example 2; and

Figure 2:
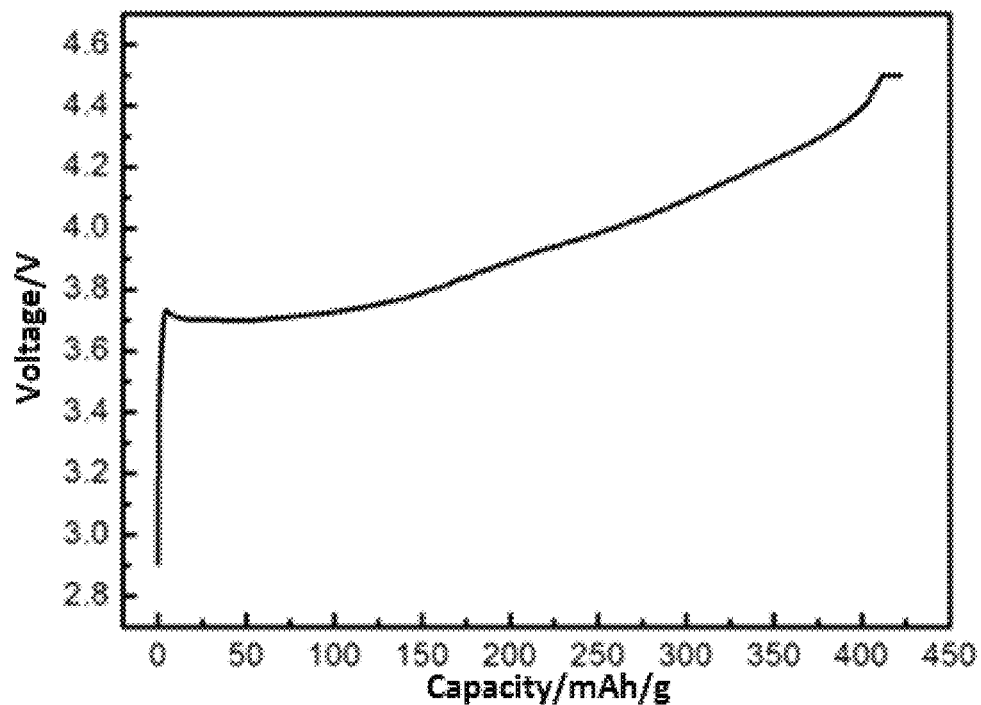
FIG. 2 is the graph of the initial charging capacity of the battery prepared from the material prepared in Example 2.

FIG. 2 is the graph of the initial charging capacity of the battery prepared from the material prepared in Example 2.

Example 3

10 kg of analytically pure nickel bromide and 0.005 g of analytically pure tantalum bromide were used as raw materials and were formulated into a solution comprising 1 mol/L sulfate. 5 L of the sulfate solution, 8 L of 1 mol/L sodium hydroxide solution, and 0.2 L of 10 mol/L aqueous ammonia were added to a reaction vessel to carry out the reaction. The precipitate was filtered, washed and dried to give precursor 1, which was denoted by $Ni_{(1-x)}Me_x(OH)_2$, wherein Me was Ta, and x was $10^{-6}$. Precursor 1 was sintered in a nitrogen atmosphere under a pressure of 30 bar and a temperature of 750° C. for 60 min, to give precursor 2, which was denoted by $Ni_{(1-x)}Me_xO$, wherein Me was Ta, and x was $10^{-6}$. 0.02 g of tantalum bromide as the inducing chemical was added to precursor 2, heated at 800° C. for 60 min, and then rapidly cooled to room temperature by liquid nitrogen to induce Martensite phase transformation. Under the synergistic action of the high pressure quenching environment and the inducing chemical, the crystal structure and the grain size were changed to give precursor 3. Precursor 3 was mixed with $Li_2O$ in an equimolar ratio, and sintered in a nitrogen atmosphere at a pressure of 40 bar and a temperature of 800° C. for 80 min, then cooled to room temperature, and crushed to a median particle size $D_{50}$ of 10 μm to give the prelithiating material. The material contains cracks, in which the width and the length of small cracks were 0.5 nm to 0.7 nm, and the width and the length of large cracks were 3 nm to 70 nm and 5 nm to 500 nm, respectively. The prelithiating material had a purity of 96.1%. A lithium ion battery was prepared using the prelithiating material as the cathode material, graphite as the anode material, and a solution of lithium hexafluorophosphate in ethyl carbonate as the electrolyte. The battery has an initial charging capacity of 423.2 mAh/g at 4.5 V.

Example 4

10 kg of analytically pure nickel sulfate and 0.01 g of an equimolar mixture of analytically pure yttrium sulfate and analytically pure strontium sulfate were used as raw materials and were formulated into a solution comprising 1 mol/L sulfate. 5 L of the sulfate solution, 8 L of 1 mol/L sodium hydroxide solution, and 0.2 L of 10 mol/L aqueous ammonia were added to a reaction vessel to carry out the reaction. The precipitate was filtered, washed and dried to give precursor 1, which was denoted by $Ni_{(1-x)}Me_x(OH)_2$, wherein Me was a combination of Y and Sr, and x was $10^{-5}$. Precursor 1 was sintered in a nitrogen atmosphere under a pressure of 30 bar and a temperature of 750° C. for 60 min, to give precursor 2, which was denoted by $Ni_{(1-x)}Me_xO$, wherein Me was Y and Sr, and x was $10^{-5}$. 0.005 g of cerium sulfate as the inducing chemical was added to precursor 2, mixed uniformly, and maintained at −196° C. in liquid nitrogen for 60 min. Under the synergistic action of the low temperature environment and the inducing chemical, the crystal structure and the grain size were changed to give precursor 3. Precursor 3 was mixed with $Li_2O$ in an equimolar ratio, and sintered in a nitrogen atmosphere at a pressure of 40 bar and a temperature of 800° C. for 80 min, then cooled to room temperature, and crushed to a median particle size $D_{50}$ of 10 μm to give the prelithiating material. The prelithiating material contains cracks, in which the width and the length of small cracks were 0.5 nm to 1 nm, and the width and the length of large cracks were 8 nm to 950 nm and 4 nm to 450 nm, respectively. The prelithiating material had a purity of 95.1%. A lithium ion battery was prepared using the prelithiating material as the cathode material, graphite as the anode material, and a solution of lithium hexafluorophosphate in ethyl carbonate as the electrolyte. The battery has an initial charging capacity of 413.6 mAh/g at 4.5 V.

Example 5

10 kg of analytically pure nickel sulfate and 0.002 g of an equimolar mixture of analytically pure yttrium sulfate, analytically pure strontium sulfate, niobium pentachloride, cerium sulfate and tantalum bromide were used as raw materials and were formulated into a solution comprising 1 mol/L sulfate. 5 L of the sulfate solution, 8 L of 1 mol/L sodium hydroxide solution, and 0.2 L of 10 mol/L aqueous ammonia were added to a reaction vessel to carry out the reaction. The precipitate was filtered, washed and dried to give precursor 1, which was denoted by $Ni_{(1-x)}Me_x(OH)_2$, wherein Me was a combination of Sr, Y, Nb, Ce and Ta, and x was $10^{-5}$. Precursor 1 was sintered in a nitrogen atmosphere under a pressure of 30 bar and a temperature of 750° C. for 60 min, to give precursor 2, which was denoted by $Ni_{(1-x)}Me_xO$, wherein Me was a combination of Sr, Y, Nb, Ce and Ta, and x was $10^{-5}$. 0.01 g of tantalum bromide as the inducing chemical was added to precursor 2, mixed uniformly, and maintained at −196° C. in liquid nitrogen for 60 min. Under the synergistic action of the low temperature environment and the inducing chemical, the crystal structure and the grain size were changed to give precursor 3. Precursor 3 was mixed with $Li_2O$ in an equimolar ratio, and sintered in a nitrogen atmosphere at a pressure of 40 bar and a temperature of 800° C. for 80 min, then cooled to room temperature, and crushed to a median particle size $D_{50}$ of 10 μm to give the prelithiating material. The prelithiating material contains cracks, in which the width and the length of small cracks were 0.5 nm to 0.9 nm, and the width and the length of large cracks were 2 nm to 50 nm and 15 nm to 350 nm, respectively. The prelithiating material had a purity of 95.6%. A lithium ion battery was prepared using the prelithiating material as the cathode material, graphite as the anode material, and a solution of lithium hexafluorophosphate in ethyl carbonate as the electrolyte. The battery has an initial charging capacity of 416.1 mAh/g at 4.5 V.

Example 6

10 kg of analytically pure nickel sulfate and 0.001 g of an equimolar mixture of analytically pure yttrium sulfate, analytically pure strontium sulfate, niobium pentachloride, cerium sulfate and tantalum bromide were used as raw materials and were formulated into a solution comprising 1 mol/L sulfate. 5 L of the sulfate solution, 8 L of 1 mol/L sodium hydroxide solution, and 0.2 L of 10 mol/L aqueous ammonia were added to a reaction vessel to carry out the reaction. The precipitate was filtered, washed and dried to give precursor 1, which was denoted by $Ni_{(1-x)}Me_x(OH)_2$, wherein Me was a combination of Sr, Y, Nb, Ce and Ta, and x was $10^{-6}$. Precursor 1 was sintered in a nitrogen atmosphere under a pressure of 30 bar and a temperature of 750° C. for 60 min, to give precursor 2, which was denoted by $Ni_{(1-x)}Me_xO$, wherein Me was a combination of Sr, Y, Nb, Ce and Ta, and x was $10^{-6}$. 0.015 g of tantalum bromide as the inducing chemical was added to precursor 2, mixed uniformly, and maintained at −150° C. in liquid nitrogen for 60 min. Under the synergistic action of the low temperature environment and the inducing chemical, the crystal structure and the grain size were changed to give precursor 3. Precursor 3 was mixed with $Li_2O$ in an equimolar ratio, and sintered in a nitrogen atmosphere at a pressure of 40 bar and a temperature of 800° C. for 80 min, then cooled to room temperature, and crushed to a median particle size $D_{50}$ of 10 μm to give the prelithiating material. The prelithiating material contains cracks, in which the width and the length of small cracks were 0.6 nm to 1 nm, and the width and the length of large cracks were 20 nm to 80 nm and 30 nm to 450 nm, respectively. The prelithiating material had a purity of 94.7%. A lithium ion battery was prepared using the prelithiating material as the cathode material, graphite as the anode material, and a solution of lithium hexafluorophosphate in ethyl carbonate as the electrolyte. The battery has an initial charging capacity of 413.2 mAh/g at 4.5 V.

Comparative Example 1

10 kg of analytically pure nickel sulfate was used as the raw material and was formulated into a solution comprising 1 mol/L sulfate. 5 L of the sulfate solution, 8 L of 1 mol/L sodium hydroxide solution, and 0.2 L of 10 mol/L aqueous ammonia were added to a reaction vessel to carry out the reaction. The precipitate was filtered, washed and dried to give precursor 1, which was denoted by $Ni(OH)_2$. Precursor 1 was sintered in a nitrogen atmosphere under a pressure of 30 bar and a temperature of 750° C. for 60 min, to give precursor 2, which was denoted by NiO. 0.005 g of cerium sulfate as the inducing chemical was added to precursor 2, mixed uniformly, heated at 700° C. for 60 min, and then rapidly cooled to room temperature by liquid nitrogen to induce Martensite phase transformation. The mixture was then maintained at −196° C. in liquid nitrogen for 60 minutes. Under the synergistic action of the high temperature quenching environment, the low temperature environment and the inducing chemical, the crystal structure and the grain size were changed to give precursor 3. Precursor 3 was mixed with $Li_2O$ in an equimolar ratio, and sintered in a nitrogen atmosphere at a pressure of 40 bar and a temperature of 800° C. for 80 min, then cooled to room temperature, and crushed to a median particle size $D_{50}$ of 10 μm to give the sample of Comparative Example 1. The sample contains cracks, in which the width and the length of the cracks were 120 nm to 1000 nm and 300 nm to 2500 nm, respectively. The sample had a purity of 65.1%. A lithium ion battery was prepared using the sample as the cathode material, graphite as the anode material, and a solution of lithium hexafluorophosphate in ethyl carbonate as the electrolyte. The battery has an initial charging capacity of 313.6 mAh/g at 4.5 V.

Comparative Example 2

10 kg of analytically pure nickel sulfate and 0.01 g of analytically pure niobium pentachloride were used as raw materials and were formulated into a solution comprising 1 mol/L sulfate. 5 L of the sulfate solution, 8 L of 1 mol/L sodium hydroxide solution, and 0.2 L of 10 mol/L aqueous ammonia were added to a reaction vessel to carry out the reaction. The precipitate was filtered, washed and dried to give precursor 1, which was denoted by $Ni_{(1-x)}Me_x(OH)_2$, wherein Me was Nb, and x was $10^{-5}$. Precursor 1 was sintered in a nitrogen atmosphere under a pressure of 30 bar and a temperature of 750° C. for 60 min, to give precursor 3, which was denoted by $Ni_{(1-x)}Me_xO$, wherein Me was Nb, and x was $10^{-5}$. Precursor 2 was mixed with $Li_2O$ in an equimolar ratio, and sintered in a nitrogen atmosphere at a pressure of 40 bar and a temperature of 800° C. for 80 min, then cooled to room temperature, and crushed to a median particle size $D_{50}$ of 10 μm to give the sample of Comparative Example 2. The sample contained cracks, in which the width and the length of the cracks were 250 nm to 1200 nm and 500 nm to 3000 nm, respectively. The sample had a purity of 60.3%. A lithium ion battery was prepared using the sample as the cathode material, graphite as the anode material, and a solution of lithium hexafluorophosphate in ethyl carbonate as the electrolyte. The battery has an initial charging capacity of 256.3 mAh/g at 4.5 V.

Comparative Example 3

10 kg of analytically pure nickel sulfate was used as the raw material and was formulated into a solution comprising 1 mol/L sulfate. 5 L of the sulfate solution, 8 L of 1 mol/L sodium hydroxide solution, and 0.2 L of 10 mol/L aqueous ammonia were added to a reaction vessel to carry out the reaction. The precipitate was filtered, washed and dried to give precursor 1, which was denoted by $Ni(OH)_2$. Precursor 1 was sintered in a nitrogen atmosphere under a pressure of 30 bar and a temperature of 750° C. for 60 min, to give precursor 2, which was denoted by NiO. 0.02 g of tantalum bromide as the inducing chemical was added to precursor 2, mixed uniformly, and maintained at −196° C. in liquid nitrogen for 60 min. Under the synergistic action of the low temperature environment and the inducing chemical, the crystal structure and the grain size were changed to give precursor 3. Precursor 3 was mixed with $Li_2O$ in an equimolar ratio, and sintered in a nitrogen atmosphere at a pressure of 40 bar and a temperature of 800° C. for 80 min, then cooled to room temperature, and crushed to a median particle size $D_{50}$ of 10 m to give the sample of Comparative Example 3. The sample contained cracks, in which the width and the length of the cracks were 500 nm to 2500 nm and 800 nm to 3500 nm, respectively. The sample had a purity of 55.6%. A lithium ion battery was prepared using the sample as the cathode material, graphite as the anode material, and a solution of lithium hexafluorophosphate in ethyl carbonate as the electrolyte. The battery has an initial charging capacity of 231.1 mAh/g at 4.5 V.

Comparative Example 4

10 kg of analytically pure nickel sulfate was used as the raw material and was formulated into a solution comprising 1 mol/L sulfate. 5 L of the sulfate solution, 8 L of 1 mol/L sodium hydroxide solution, and 0.2 L of 10 mol/L aqueous ammonia were added to a reaction vessel to carry out the reaction. The precipitate was filtered, washed and dried to give precursor 1, which was denoted by $Ni(OH)_2$. Precursor 1 was sintered in a nitrogen atmosphere under a pressure of 30 bar and a temperature of 750° C. for 60 min, to give precursor 3, which was denoted by NiO. Precursor 3 was mixed with $Li_2O$ in an equimolar ratio, and sintered in a nitrogen atmosphere at a pressure of 40 bar and a temperature of 800° C. for 80 min, then cooled to room temperature, and crushed to a median particle size $D_{50}$ of 10 μm to give the sample of Comparative Example 4. The sample contained cracks, in which the width and the length of the cracks were 200 nm to 1800 nm and 600 nm to 2200 nm, respectively. The sample had a purity of 67.4%. A lithium ion battery was prepared using the sample as the cathode material, graphite as the anode material, and a solution of lithium hexafluorophosphate in ethyl carbonate as the electrolyte. The battery has an initial charging capacity of 333.2 mAh/g at 4.5 V.

The cracks in the samples of the examples and the comparative examples were determined by scanning electron microscope SEM3000.

The median particle sizes $D_{50}$ of the samples of the examples and the comparative examples were determined by LS-909E laser particle size analyzer.

The BET specific surface areas of the samples of the examples and the comparative examples were determined according to GB/T19587-2017 "Determination of the specific surface area of solids by gas adsorption using the BET method".

The purities of the samples of the examples or the comparative examples were calculated by fitting to the shapes of XRD peaks by X-ray diffractometer (D8 Advance).

In the lithium ion batteries prepared using the samples of the examples and the comparative examples as the cathode material, graphite as the anode material, and a solution of lithium hexafluorophosphate in ethyl carbonate as the electrolyte, the initial charging capacities at 4.5 V were determined according to YS/T 798-2012 "Lithium nickel cobalt manganese oxide".

For the samples obtained in Examples 1 to 6 and Comparative Examples 1 to 4, the specific surface areas of precursor 3, the purities of the prelithiating materials of Examples 1 to 6 and of the samples of Comparative Examples 1 to 4, and the initial charging capacities at 4.5 V of the corresponding batteries, respectively, were determined, and the relevant results are shown in Table 1.

TABLE 1

Test results for the samples of the examples and the comparative examples

| | $Ni_{(1-x)}Me_xO$ BET/m²/g | $Li_2Ni_{(1-x)}Me_xO_2$ | |
| --- | --- | --- | --- |
| | | Purity/% | Initial Charging Capacity at 4.5 V/mAh/g |
| Example 1 | 30.5 | 94.5 | 410.5 |
| Example 2 | 54.2 | 97.6 | 431.1 |
| Example 3 | 38.6 | 96.1 | 423.2 |
| Example 4 | 42.5 | 95.1 | 413.6 |
| Example 5 | 34.2 | 95.6 | 416.1 |
| Example 6 | 48.6 | 94.7 | 413.2 |
| Comparative Example 1 | 3.2 | 65.1 | 313.6 |
| Comparative Example 2 | 2.1 | 60.3 | 256.3 |
| Comparative Example 3 | 2.2 | 55.6 | 231.1 |
| Comparative Example 4 | 3.6 | 67.4 | 333.2 |

It can be seen from Table 1 that the specific surface areas of precursor 3 in Examples 1 to 6 are much higher than those of precursor 3 in Comparative Examples 1 to 4. A larger specific surface area of precursor 3 means more crack structures, and favors the preparation of high purity prelithiating materials. This is confirmed by the purity data of the samples of Examples 1 to 6 and Comparative Examples 1 to 4, i.e. the larger the specific surface area, the higher the purity of the prelithiating material. In the method for preparing the prelithiating material, the crystal structure is changed and the volume of the grain size is further increased by the inducing effect of the inducing environment or the inducing chemical, so that lithium ions can react with NiO more sufficiently, thereby reducing the segregation, improving the purity and density of the prelithiating material, improving the delithiation capacity. Comparing with the samples prepared in Comparative Examples 1 to 4 with single or no inducing factor, the prelithiating materials prepared in Examples 1 to 6 with multiple inducing factors are superior in the initial charging capacities at 4.5 V, which further indicates that the prelithiating materials have high delithiation capacities.

It should be noted by a person skilled in the art that the described embodiments of the present invention are merely exemplary, and various other replacements, changes and improvements may be made within the scope of the present invention. Therefore, the present invention is not limited to the above-described embodiments, but only by the claims.

The invention claimed is:

1. A lithium ion battery with high capacity, which comprises:
    an cathode material, which has a chemical formula $LiNi_{(1-x)}Me_xO$, wherein x is $10^{-6}$ to $10^{-1}$, and Me is a third metal other than Li and Ni;
    a anode material; and
    an electrolyte.

2. The lithium ion battery according to claim 1, wherein the third metal is one or more elements selected from the group consisting of Sr, Y, Nb, Ce, Ta, Mo and W.

3. The lithium ion battery according to claim 1, wherein the cathode material contains cracks, which have a width of 0.5 nm to 1 nm or 1 nm to 100 nm, and a length of 0.5 nm to 1 nm or 1 nm to 500 nm.

4. The lithium ion battery according to claim 1, wherein the cathode material has a median particle size $D_{50}$ of 1 μm to 20 μm, and a specific surface area of 0.1 m²/g to 100 m²/g.

5. The lithium ion battery according to claim 1, wherein the cathode material is prepared by a method comprising the following steps:
    S1, preparing precursor 1 from a nickel salt and an additive by chemical co-precipitation;
    S2, calcining precursor 1 in an inert atmosphere, to prepare precursor 2;
    S3, subjecting precursor 2 to an inducing treatment to induce a crack structure, to prepare precursor 3; and
    S4, mixing precursor 3 with $Li_2O$ in an equimolar ratio, sintering in an inert atmosphere, and crushing to prepare the cathode material.

6. The lithium ion battery according to claim 5, wherein in step S1, the nickel salt is one or more of nickel sulfate, nickel nitrate, nickel chloride, and nickel bromide.

7. The lithium ion battery according to claim 5, wherein the additive is one or a mixture of Sr, Y, Nb, Ce, Ta, Mo and W compounds.

8. The lithium ion battery according to claim 5, wherein in step S3, the inducing treatment comprises placing in an inducing environment and/or adding an inducing chemical, wherein the inducing environment is a low temperature environment, a high pressure environment, a high temperature quenching environment, or a combination thereof.

9. The lithium ion battery according to claim 8, wherein the temperature for the low temperature environment is from −100° C. to −250° C.; the pressure for the high pressure environment is from 10 bar to 500 bar; the high temperature quenching environment comprises first heating to a temperature of 300° C. to 800° C., and then rapidly cooling to room temperature in liquid nitrogen; and the inducing chemical is one or a mixture of Sr, Y, Nb, Ce, Ta, Mo and W compounds.

10. The lithium ion battery according to claim 5, wherein the lithium ion battery has an initial charging capacity of above 410 mAh/g at 4.5 V.

* * * * *